United States Patent [19]

Bürger

[11] 4,341,534

[45] Jul. 27, 1982

[54] METHOD AND APPARATUS FOR DEGASSING THE PRESSURE FLUID OF A HYDRAULIC SYSTEM

[76] Inventor: Herbert Bürger, Berliner Ring 50, D-6980 Wertheim, Fed. Rep. of Germany

[21] Appl. No.: 183,894

[22] Filed: Sep. 4, 1980

[30] Foreign Application Priority Data

Sep. 20, 1979 [DE] Fed. Rep. of Germany ....... 2937957

[51] Int. Cl.³ ............................................. B01D 19/00
[52] U.S. Cl. ........................................... 55/55; 55/48
[58] Field of Search ................. 55/48, 49, 52, 55, 164, 55/189, 190, 192, 200

[56] References Cited

U.S. PATENT DOCUMENTS

| | | | |
|---|---|---|---|
| 1,598,787 | 9/1926 | Shields et al. | 55/48 X |
| 2,151,644 | 3/1939 | Stephens | 55/55 X |
| 2,203,388 | 6/1940 | Kantor | 55/192 |
| 2,797,767 | 7/1957 | Brooke et al. | 55/55 X |
| 3,517,487 | 6/1970 | Burnham, Sr. | 55/192 |
| 3,778,969 | 12/1973 | Sudduth | 55/55 |
| 3,789,579 | 2/1974 | El-Hindi | 55/55 X |
| 4,010,012 | 3/1977 | Griffin et al. | 55/164 X |

FOREIGN PATENT DOCUMENTS 2221551 11/1973 Fed. Rep. of Germany .
522918 7/1940 United Kingdom ................. 55/192

OTHER PUBLICATIONS

Blume, "Luft im Hydrauliksystem", Magazine Öelhydraulik und Pneumatik 16 (1972) No. 9, pp. 389–392.

Primary Examiner—Robert H. Spitzer
Attorney, Agent, or Firm—Blanchard, Flynn, Thiel, Boutell & Tanis

[57] ABSTRACT

A method and apparatus are disclosed for degassing the pressure fluid of a hydraulic system, in which a vacuum is maintained in the free space above the pressure fluid in the fluid reservoir of the hydraulic system by a vacuum pump. The vacuum pump has a selective pumping action, by virtue of which permanent gases present in the free space are withdrawn but vapors of the pressure fluid present in the free space are not withdrawn. Pressure fluid entering the reservoir from the hydraulic system is passed over a degassing surface to promote separation of the permanent gases in the pressure fluid from the fluid. A compensating line is provided between the vacuum pump and the reservoir for returning to the reservoir the nominal amounts of pressure fluid withdrawn from the reservoir by the pump. Valves provided in all fluid lines leading to and from the reservoir maintain the vacuum in the reservoir during system shut-downs.

6 Claims, 1 Drawing Figure

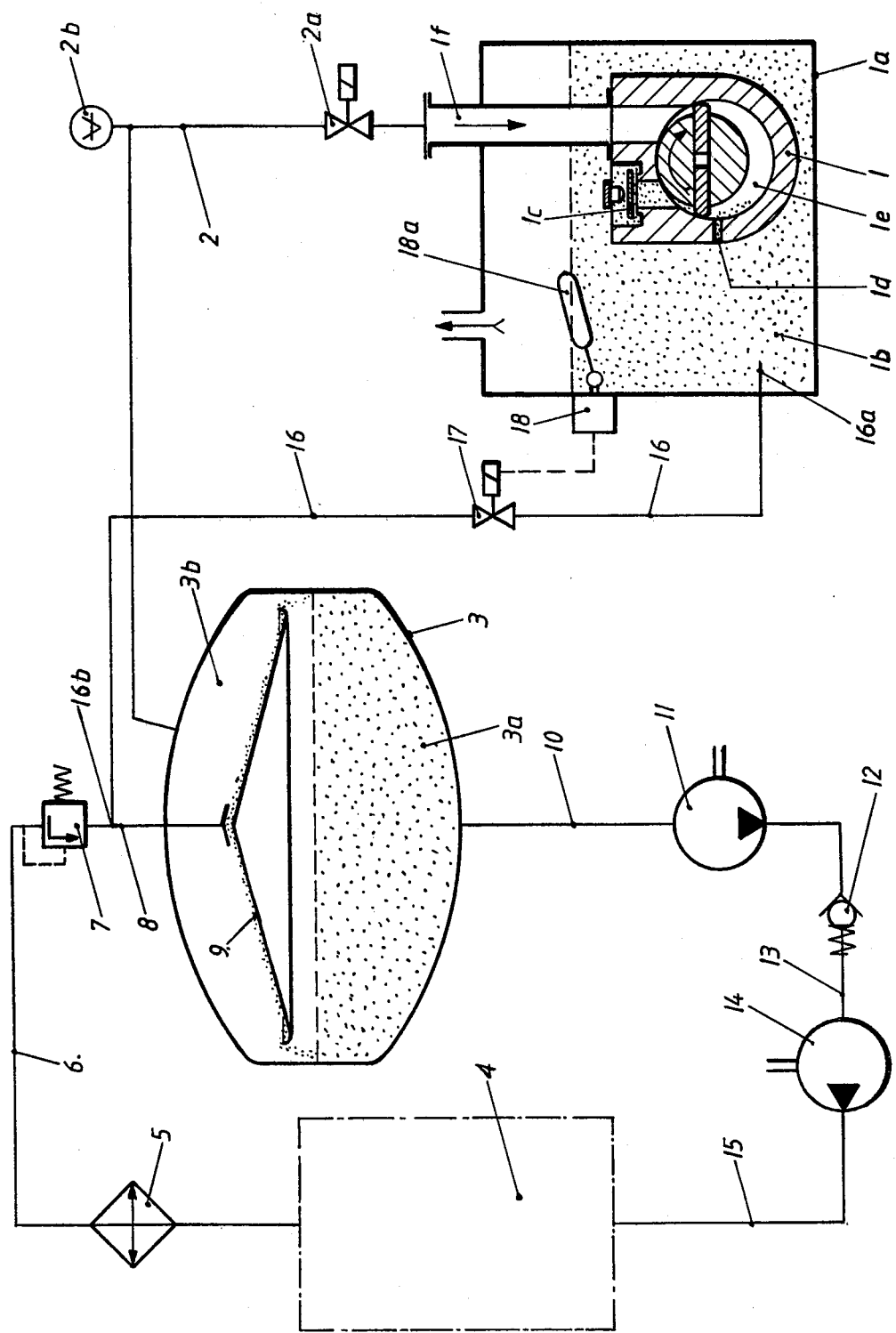

METHOD AND APPARATUS FOR DEGASSING THE PRESSURE FLUID OF A HYDRAULIC SYSTEM

FIELD OF THE INVENTION

The invention relates to a method and an apparatus for degassing the pressure fluid of a hydraulic system, and more particularly relates to a method and apparatus for degassing the pressure fluid of a hydraulic system in which the free space above the pressure fluid in a reservoir containing said pressure fluid is maintained under a vacuum produced by a vacuum pump, such that the permanent gases present in the pressure fluid are continuously withdrawn therefrom.

BACKGROUND OF THE INVENTION

It is known that the quantity of permanent gases dissolved in a fluid depends upon the pressure which exists at the contact surface between the gas and the fluid. A reduced quantity of such permanent gases in the pressure fluid of a hydraulic system is desirable, so that the pressure fluid is as incompressible as possible and the operation of the elements of the hydraulic system by the fluid is as precise as possible. Furthermore, degassing avoids gas cavitation (pseudocavitation), dieseling effects and accumulations of air bubbles within the hydraulic system.

In a known method and apparatus for degassing the pressure fluid of a hydraulic system of the above-mentioned type (German OS No. 2 221 551), the free space of a reservoir containing the pressure fluid of the hydraulic system is not open to the surrounding atmosphere as is usually the case, but rather is connected to a vacuum pump which produces and maintains a vacuum in the free space above the fluid. As a result, the percentage of permanent gases in the pressure fluid is reduced proportionally to the ratio of the pressure in the reservoir with respect to the atmospheric pressure. This known degassing method, however, was unsuccessful in practice, because the degassing was insufficient compared to the added expense. To avoid evaporation losses of the pressure fluid and the changes in characteristics associated therewith, such as viscosity increase and increase of the setting point, it has been suggested that the vacuum in the reservoir be limited, based on the boiling point of the pressure fluid. This limitation of the vacuum, however, prevents effective degassing of the pressure fluid. For example, it is not sufficient to lower the saturation pressure of the dissolved permanent gases from the normal condition, as from 1 bar to 0.45 bar or in an extreme case to 0.1 bar, as is stated in the technical literature (Kurt Blume, "Luft im Hydrauliksystem", Magazine Oelhydraulik und Pneumatik 16, 1972, No. 9, Pages 389 to 392). Experimental tests have shown that the pressure in the pressure fluid can drop at throttle points and at sharp-edged flow deflections to values of 1 mbar under conditions which exist in almost every conventional hydraulic system. In view of these experiments, in conventional vacuum degassing devices the lowest permissible vacuum of 0.13 bar is induced, then the saturation pressure of the dissolved air or other permanent gases in the pressure fluid of the hydraulic system will still be undesirably high. In spite of the degassing, gas cavitation, dieseling effects and accumulation of air bubbles occur within the hydraulic system and lead to the known disadvantageous consequences. It is clear that with such limited effectiveness, the additional expense for a vacuum degassing device of the conventional type is not practicable. Limiting the vacuum induced and regulating it to a sufficiently constant value, which are necessary in the conventional degassing device, in and of themselves require a considerable construction expense and also introduce additional sources of potential breakdown into the entire system.

Accordingly, it is an object of this invention to provide a method and an apparatus for degassing the pressure fluid of a hydraulic system, in which simple means provide extensive degassing without additional evaporation losses, viscosity increase and other undesired changes in characteristics of the pressure fluid in the hydraulic system.

SUMMARY OF THE INVENTION

The objects and purposes of the invention are met by providing a system in which the partial pressure of permanent gases in the free space of a pressure fluid reservoir is lowered to a value which is as low as possible by means of a vacuum pump with a selective pumping action which pumps permanent gases but does not pump the vapor of the pressure fluid.

The advantages of the invention are manifold and effect a significant improvement in the quality of hydraulic systems. Compared with known methods for degassing the pressure fluid of a hydraulic system, the inventive method offers the decisive advantage of truly complete degassing of the pressure fluid. At the same time, undesirable evaporation of the fluid is avoided. Gas cavitation and its undesired consequences are prevented. Further, for life spans of the most expensive components of the hydraulic system are increased. The virtually gas-free pressure fluid is unable to emit gas or air at any point in the system cycle and, the dynamic behavior of the hydraulic system is improved. The aggravation of vibrations, pressure impacts and the noises associated therewith due to the energy stored in compressed gas bubbles is also avoided. The most frequent causes of seal breakdown, dieseling and explosive expansion of gas bubbles, are eliminated.

Another important advantage of the invention is that the total amount of pressure fluid needed in the hydraulic system is drastically reduced. Due to effective degassing a retention period in the reservoir is not needed for the fluid, and the capacity of the reservoir therefore need only be sufficiently large to handle the maximum volume variations of the system and to include a reserve for unavoidable leakage losses. The resulting reservoir is typically only a fraction of the size of that necessary in a conventional system where the reservoir is maintained at atmospheric pressure. This advantage not only reduces the cost and size of the hydraulic system, but has the more important effect of reducing the dangers associated with flammable and environment-damaging hydraulic fluids.

Another important advantage of the invention exists in the ability to choose an operating temperature for the pressure fluid within the hydraulic system which is higher than that previously common or feasible. This temperature increase can be advantageous for technical or for economic reasons. Since the virtually complete degassing means that oxidation-based alteration of the pressure fluid will not occur, the temperature increase will not decrease the fluid's useful life span.

The necessary construction costs of the degassing apparatus is also reduced by the invention, since neither an additional vacuum buffer nor an expensive regulating device for limiting the vaccum are needed.

Another advantage of the invention is that the partial pressure of the permanent gas in the free space of the reservoir is advantageously kept under 1 mbar.

The permanent gases in the reservoir are preferably removed by a liquid-densified vacuum pump, the operating fluid (lubricating and sealing fluid) of which is the same type of fluid used for the pressure fluid of the hydraulic system. Such liquid-densified vacuum pumps, if they use as an operating fluid the same fluid used for the pressure fluid of the hydraulic system, provide the desired selective effect. The operating fluid in such pumps serves not only to effect lubrication of the pump, but primarily to effect sealing. This dual function of the operating fluid permits the creation of a vacuum for permanent gases below 0.01 mbar. With an increasing vacuum, the volume of permanent gases conveyed becomes very small and effectively only operating fluid remains in the dipping chamber of the pump. The operating fluid then evaporates unhindered in the suction zone of the pump because of the vacuum which exists there. For this reason, among others, it is necessary to continuously introduce operating fluid in a sufficient amount into the pump's dipping chamber. The saturation vapor pressure of the operating fluid which exists at the suction sleeve of such pumps corresponds with the pump-operating temperature.

If according to the invention the operating fluid used for the liquid-densified vacuum pump is the same as the pressure fluid in the connected hydraulic system, and if the pressure fluid in the reservoir of the hydraulic system has approximately the same temperature as the operating fluid in the vacuum pump, then vapor of the pressure fluid will not move from the reservoir into the vacuum pump in response to the pump action because a vapor pressure balance will exist between the pressure fluid in the reservoir and the same fluid in the vacuum pump. The effect of the vacuum pump on permanent gases, however, is in no manner influenced, according to Dalton's Law. As a result, the partial pressure of the permanent gases in the free space of the reservoir can be reduced to any desired low value. The extensive degassing of the pressure fluid thus achieved means gas cavitation, dieseling and accumulations of air bubbles within the hydraulic system are avoided, along with the consequences associated therewith.

In carrying out the present invention it is important that the operating fluid of the vacuum pump be kept as much as possible at the same temperature as the pressure fluid in the reservoir, so that the above-mentioned vapor pressure balance exists therebetween. Since this vapor pressure balance in practice cannot be constantly maintained with absolute precision, the inventive apparatus may advantageously be provided with a compensating line extending between the reservoir of the hydraulic system and the operating fluid container of the vacuum pump, one end of the compensating line being positioned below the fluid level in the operating fluid container and the other end of the line being positioned above the fluid level in the reservoir, and a valve in the compensating line which is opened in response to an increase in the fluid level in the operating fluid container in order to allow fluid to flow through the compensating line from the fluid container to the reservoir. This apparatus ensures that at all times, even under exceptional conditions and in cases of breakdowns, pressure fluid pumped from the reservoir into the vacuum pump is returned to the reservoir. More specifically, a float is advantageously provided to control the valve and is arranged in the operating fluid container or a different suitable apparatus, such that a level increase of the operating fluid in the operating fluid container of the vacuum pump will lift the float and thereby cause the valve in the balancing line to open until the fluid level in the operating fluid container has again returned to the normal level. The operating fluid in the operating fluid container of the vacuum pump is at atmospheric pressure and the reservoir is under a vacuum, and this pressure difference alone is sufficient to return the pressure fluid through the compensating line into the reservoir. This arrangement, of course, also functions when pressure fluid in vapor form enters the vacuum pump from the reservoir, since the high compression in the pump results in a liquefaction of the vapor in the dipping chamber of the pump.

BRIEF DESCRIPTION OF THE DRAWINGS

The method and an exemplary embodiment of apparatus for carrying out the method will be described in greater detail hereinafter in connection with the accompanying drawing.

DETAILED DESCRIPTION OF THE DRAWINGS

A liquid-densified rotary-piston vacuum pump 1, which has been built in a conventional manner with rotary slide valve construction, is disposed in an operating fluid container 1a, partially filled with an operating fluid 1b, which fluid 1b is shown in the drawing as a dotted surface. The pump 1 comprises an outlet valve 1c and an opening 1d for introducing the operating fluid 1b into a dipping chamber 1e provided within the pump 1.

The pump 1 is connected through a suction sleeve 1f and a vacuum feed line 2 to the reservoir 3 of a hydraulic system 4. The valve 2a is built into the vacuum line 2 to prevent the operating fluid 1b or air from passing into the reservoir 3 when the vacuum pump 1 is stopped. The vacuum meter 2b is used to control the pressure in the reservoir 3.

The reservoir 3 is designed to be vacuum-tight and is filled only partially with pressure fluid 3a which is illustrated as a dotted surface. The free space 3b above the fluid 3a is under a vacuum induced by the pump 1.

The hydraulic system 4, which is illustrated only as a dash-dotted rectangle without details, contains all motors, control and regulating members, and other structural elements which are needed for operation in a conventional application. This hydraulic system 4 need not differ in any significant respect from any hydraulic system of the conventional type, which commonly has a reservoir which is maintained at atmospheric pressure. Thus, the present invention can easily be used on existing hydraulic systems. The operating fluid 1b and the pressure fluid 3a are the same, for example, hydraulic oil.

The operational cycle of the pressure fluid will now be described, beginning at the hydraulic system 4. The pressure fluid flows from the hydraulic system 4 into a cooler 5 and carries heat absorbed from the hydraulic system 4. The cooler 5 is important for effective operation of the inventive apparatus, because the reservoir 3 must be kept substantially smaller than in conventional systems, so that a heat exchange in the reservoir 3 itself is not smart. The pressure fluid which has been cooled by the cooler 5 passes through the return line 6 and the pressure valve 7 into the line 8 which is maintained under a vacuum. From the line 8 the fluid passes into the reservoir 3 onto a thin-layer degassing surface 9, which is illustrated in the drawing as a cone-shaped shell. This arrangement promotes optimum degassing of the pressure fluid prior to its deposit into the fluid storage 3a. The cooling of the pressure fluid in the cooler 5 before entry into the evacuated reservoir 3 has no disadvantageous influence on the effectiveness of the degassing, since the Bunsen dissolving coefficient, for example for air in hydraulic oil between 0° C. and 100° C., remains practically constant over the relevant temperature range.

The pressure valve 7 constantly maintains the pressure in the return line 6, the cooler 5 and the return of the hydraulic system 4 at slightly more than 1 bar, so that air is not introduced into the pressure fluid through small leakages in the lines and couplings, which air would tend to defeat the vacuum maintained in the reservoir 3.

The pressure fluid exits from the reservoir 3 through the line 10 into the transfer pump 11, which for example may be a rotary pump, and then passes through the check valve 12 and the line 13 into the main hydraulic pump 14. The main pump 14 forces the pressure fluid through the pressure line 15 into the hydraulic system 4, with which the operational fluid cycle is closed. The provision of the transfer pump 11 is known, and is required as a rule in situations where the main pump 14 is a state of the art hydraulic pump which requires a certain minimum fill pressure in order to avoid efficiency losses. The transfer pump 11 can be omitted if the reservoir 3 is positioned a sufficient height above the main pump 14 to ensure that the resulting fluid column provides sufficient fill pressure. In either case, the fill pressure can be kept substantially lower than in conventional arrangements of the hydraulic pump, since the danger of gas cavitation does not exist in the inventive arrangement.

The check valve 12 prevents the return of pressure fluid from the hydraulic system 4 into the reservoir 3, which otherwise might, for example, occur when the hydraulic pump 14 fails. It also acts with the valves 2a and 7 to ensure that when the entire hydraulic system including the vacuum pump 1 is stopped, the pressure in the reservoir 3 does not increase. Thus, the pressure fluid 3a will not absorb any gases during operating breaks, such that when the hydraulic system is restarted, gas-free pressure fluid is available immediately.

One end 16a of a compensating line 16 lies below the fluid level in the operating fluid container 1a of the vacuum pump 1, and the other end 16b is connected to the line 8 to the reservoir 3, which line 8 is maintained under a vacuum. The valve 17 is controlled by the float 18a and float switch 18, and pressure fluid which may possibly come from the reservoir 3 and move into the fluid container 1a through the vacuum pump 1 is returned directly into the reservoir 3. The connection of the end 16b to the line 8 ensures that any such returned pressure fluid is degassed on the degassing surface 9 as it enters the reservoir 3.

The invention may be utilized with all pressure fluids which are suited for hydraulic systems, including water-containing pressure fluids. Particularly in the case of the latter, care must be taken that the temperature of the pressure fluid in the reservoir 3 and in the vacuum pump 1 be kept as low as possible so that the saturation vapor pressure of the pressure fluid does not lead to breakdowns in the system.

The invention is not limited to the exemplary embodiment illustrated in the drawings. In place of the rotary piston vacuum pump in the rotary slide valve construction, any desired vacuum pump may be used if it can selectively pump permanent gases at pressures which are as low as possible, preferably under 1 mbar, but at the same time does not pump the vapor of the pressure fluid.

OPERATION

Although the operation of the apparatus described above will be understood from the foregoing description by persons skilled in the art, a summary of such operation is now given for convenience.

Pressure fluid to be supplied to a hydraulic system 4 is drawn by a pump 11 through a line 10 from a reservoir 3 containing fluid 3a. The pump 11 forces the fluid through a check valve 12 and supplies it under pressure through a line 13 to the main hydraulic pump 14. The main hydraulic pump 14 then supplies the fluid under pressure to the hydraulic system 4.

Upon exit from the hydraulic system 4, the fluid passes through a cooler 5 which removes from the fluid any heat the fluid absorbed from the hydraulic system 4. From the cooler 5, the fluid passes through the line 6, the pressure valve 7 and the line 8 into the reservoir 3. Upon entering the reservoir 3, the fluid passes over the conical degassing surface 9 which facilitates the evaporation from the fluid of any extraneous gases in the fluid. The fluid then becomes once again a part of the fluid 3a in the reservoir 3.

A vacuum is maintained in the free space 3b at the top of the reservoir 3 by the vacuum pump 1 through the line 2. The vacuum pump 1 is a liquid-densified vacuum pump, and therefore utilizes an operating fluid 1b from the container 1a in its dipping chamber 1e to effect both lubrication and sealing. The operating fluid 1b in the dipping chamber 1e gradually evaporates due to the vacuum generated by the pump 1, and so additional operating fluid 1b is gradually introduced into the dipping chamber 1e through the opening 1d. Since the operating fluid 1b utilized in the pump 1 is the same fluid as the pressure fluid 3a contained in the reservoir 3 and since the cooler 5 is used to maintain the fluid 3a at substantially the same temperature as the fluid 1b, the vapor of the pressure fluid 3a present in the free space 3b of the reservoir 3 will be at substantially the same pressure as the vapor of the operating fluid 1b present within the vacuum pump 1. As a result of this vapor pressure balance, the vacuum pump 1 will remove permanent gases present in the free space 3b of the reservoir 3 but will not remove vapors of the pressure fluid 3a present in the free space 3b of the reservoir 3.

The permanent gases which are pumped by the vacuum pump 1 from the free space 3b of the reservoir 3 will exit from the vacuum pump 1 into the container 1a at the outlet valve 1c and, since the container 1a is open to the atmosphere, will ultimately return to the atmosphere. It is, of course, inevitable that a small amount of the vapor of the pressure fluid 3a will be removed from the free space 3b of the reservoir 3 by the pump 1, which vapor will condense and become part of the operating fluid 1b in the container 1a. This will necessarily mean that the level of the operating fluid 1b in the container 1a will gradually rise until it lifts the float 18a sufficiently to activate the float switch 18, which in turn will open the valve 17. With the valve 17 open, the pressure differential between the container 1a and the reservoir 3 will cause operating fluid 1b to flow through the compensating line 16 into the line 8 leading to the reservoir 3 until the level of the fluid 1b and the float 18a drop sufficiently to deactivate the float switch 18 and close the valve 17. In this manner, the proper level of pressure fluid 3a is maintained in the reservoir 3, and the fact that the compensating line 16 empties into the reservoir 3 through the line 8 means that fluid from the line 16 will necessarily pass over the degassing surface 9 as it enters the reservoir 3.

The valves 2a, 7, 12 and 17 are each disposed in a respective fluid line leading to or from the reservoir 3, such that during a system shut-down the vacuum present in the reservoir 3 is maintained and gas-free pressure fluid 3a is immediately available at the time the system is re-started.

The embodiments of the invention in which an exclusive property or privilege is claimed are defined as follows:

1. In a method for degassing a pressure fluid of a hydraulic system, including the step of producing a vacuum in a free space above said pressure fluid in a reservoir containing said pressure fluid, whereby permanent gases which are contained in said pressure fluid are continuously removed, the improvement comprising wherein the step of producing said vacuum is carried out by a vacuum pump with a selective action which pumps said permanent gases but does not pump the vapor of said pressure fluid, whereby the partial pressure of said permanent gases in said free space of said reservoir is lowered to a value which is substantially below atmospheric pressure.

2. The method according to claim 1, wherein the partial pressure of said permanent gases in said free space of said reservoir is kept under 1 mbar.

3. The method according to claim 1 or claim 2, wherein said vacuum pump is a liquid-sealed vacuum pump, the lubricating and sealing fluid of which is said pressure fluid of said hydraulic system.

4. The method according to claim 3, including the step of maintaining said lubricating and sealing of said vacuum pump at approximately the same temperature as said pressure fluid in the reservoir.

5. The method according to claim 1 or claim 2, including the step of passing all said pressure fluid entering said reservoir over a thin-layer degassing surface.

6. The method according to claim 1 or claim 2, including the step of extracting heat absorbed from said hydraulic system by said pressure fluid from said pressure fluid before said pressure fluid is returned to said reservoir.

* * * * *

UNITED STATES PATENT AND TRADEMARK OFFICE
CERTIFICATE OF CORRECTION

PATENT NO. : 4 341 534
DATED : July 27, 1982
INVENTOR(S) : Herbert Bürger

It is certified that error appears in the above—identified patent and that said Letters Patent is hereby corrected as shown below:

Col. 8, line 16; change "sealing of said" to ---sealing fluid of said---.

Signed and Sealed this

Second Day of November 1982

[SEAL]

Attest:

Attesting Officer

GERALD J. MOSSINGHOFF
Commissioner of Patents and Trademarks